United States Patent [19]

Ramshaw et al.

[11] 4,400,275
[45] Aug. 23, 1983

[54] MASS TRANSFER APPARATUS AND PROCESS

[75] Inventors: Colin Ramshaw, Norley; Roger H. Mallinson, Middlesbrough, both of England

[73] Assignee: Imperial Chemical Industries PLC, London, England

[21] Appl. No.: 323,582

[22] Filed: Nov. 20, 1981

[30] Foreign Application Priority Data

Dec. 8, 1980 [GB] United Kingdom ............... 8039283

[51] Int. Cl.³ .................... B01D 33/06; B01D 3/30
[52] U.S. Cl. ............................ 210/321.1; 210/497.1; 422/48
[58] Field of Search .................. 55/16, 158; 210/648, 210/497.1, 321.1, 500.2; 422/48

[56] References Cited

U.S. PATENT DOCUMENTS

| | | | |
|---|---|---|---|
| 2,422,882 | 6/1947 | Bramley | 55/16 X |
| 3,339,341 | 9/1967 | Maxwell et al. | 55/16 |
| 3,523,568 | 8/1970 | van Leeuwen | 55/16 X |
| 3,794,468 | 2/1974 | Leonard | 55/158 X |
| 3,884,814 | 5/1975 | Vogt et al. | 55/158 X |
| 3,984,328 | 10/1976 | Brun et al. | 210/500.2 X |
| 4,207,192 | 6/1980 | Coplan et al. | 55/158 X |

FOREIGN PATENT DOCUMENTS

| | | |
|---|---|---|
| 2568 | 6/1979 | European Pat. Off. |
| 20055 | 12/1980 | European Pat. Off. |
| 757149 | 9/1956 | United Kingdom |

*Primary Examiner*—Robert H. Spitzer
*Attorney, Agent, or Firm*—Cushman, Darby & Cushman

[57] ABSTRACT

Apparatus for effecting mass transfer between two fluid phases, at least the first of which is a liquid, which apparatus comprises an annular permeable element which is rotatable about its axis of symmetry, means to charge the first fluid to the permeable element, means to charge the second fluid to the permeable element, and means to discharge at least one of the fluids or a derivative thereof from the permeable element characterized in that the permeable element is formed by winding a tape under tension around the said axis and anchoring the tape to maintain it under tension.

6 Claims, 5 Drawing Figures

MASS TRANSFER APPARATUS AND PROCESS

This invention relates to apparatus for effecting mass transfer between two fluid phases, at least one of which is a liquid, and to the use of such apparatus.

By "mass transfer" we mean transfer to a first fluid phase from a second fluid phase, or vice versa, of at least a proportion of a substance which is a solute for the first fluid phase wherein the first fluid phase (a) is a liquid, (b) is substantially immiscible with the second fluid phase and (c) has a density greater than that of the second fluid phase. Absorption and distillation, processes which are widely used in the chemical and petrochemical industries, are typical mass transfer processes.

It is known from U.K. Patent Specification No. 757,149 that the rate of mass transfer between two fluid phases may be increased by subjecting the fluids to an acceleration up to approximately 2000 meters seconds$^{-2}$ while they flow through conventional packing material in rotary mass transfer apparatus. Our European Patent Publication No. 2568A discloses that a further increase in the rate of mass transfer may be obtained by employing, in a rotary mass transfer apparatus, a permeable element having an interfacial area of at least 1500 meters$^2$/meters$^3$ and our European Patent Publication No. 20055A discloses that the rate of mass transfer may also be improved by (a) employing a permeable element which comprises strands, fibres, fibrils or filaments having a so-called "equivalent diameter" of less than about 150 microns and/or (b) rotating the permeable element to subject the fluids flowing through the pores thereof to a mean acceleration of more than about 5000 meters seconds$^{-2}$.

Where, in the aforementioned apparatus, the permeable element is in the form of a disc or annulus and comprises an agglomeration of fibres, or a loosely wound tape, although the permeable element appears substantially uniform and homogeneous prior to and subsequent to rotation at high speed in the aforementioned apparatus, during rotation at high speed there is a tendency for portions of the permeable element to move relative to other portions thereof such that gaps are generated in the permeable element, the apparatus becomes unbalanced, the voidage of the permeable element alters and the performance of the apparatus deteriorates.

We have found that, where a permeable element in the shape of a disc or annulus is formed by winding a tape, such disadvantages may be at least alleviated by winding at least a first tape under tension in a plane perpendicular to the axis of rotation of the disc or annulus.

Accordingly, the present invention provides apparatus for effecting mass transfer between two fluid phases, at least the first of which is a liquid, which apparatus comprises an at least substantially annular permeable element (as hereinafter defined) which is rotatable about its axis of symmetry, means to charge the first fluid to the permeable element, means to charge the second fluid to the permeable element, and means to discharge at least one of the fluids or a derivative thereof from the permeable element characterised in that the permeable element is formed by winding a tape under tension around the said axis and in a plane transverse to the said axis, and anchoring the tape to maintain it under tension.

The present invention further provides a process for effecting mass transfer between two fluid phases, at least the first of which is a liquid, which process comprises charging the said fluids to an at least substantially annular permeable element (as hereinafter defined), rotating the permeable element about its axis of symmetry such that the fluids are subjected to a mean acceleration of at least 150 meters seconds$^{-2}$ as they flow through the pores of the permeable element with the first fluid flowing radially outwards away from the said axis and collecting at least a portion of one of the fluids or a derivative thereof discharged from the permeable element characterised in that the permeable element is formed by winding a tape under tension around the said axis and in a plane transverse to the said axis and maintaining it under tension.

Preferably the direction in which the tape is wound, that is clockwise or anti-clockwise, is such that rotation of the permeable element in operation of the apparatus of the present invention will tend to tighten the tape around the axis of the permeable element.

By "permeable element" we mean an element of apparatus according to the present invention which (a) allows passage of the fluids through the pores thereof, the wall surfaces of the said pores providing a tortuous and substantially continuous path over which the fluids may flow, and (b) is rotatable to subject the fluids flowing therethrough to a mean acceleration as hereinafter defined of at least 150 meters seconds$^{-2}$.

Within the term "tape" we include tapes, ribbons, and strips, etc.

The tape may be a single layer or a plurality of layers, e.g. formed by collapsing a tube or so-called "stocking". Whilst the tape is preferably formed from fibres, particularly preferably by knitting or weaving, more particularly preferably by knitting, we do not exclude the possibility that it may be formed from nonfibrous material, e.g. by punching holes in a suitable metal foil.

Within the term "fibres" we include fibres, fibrils, filaments, strands, etc., and mixtures thereof.

Where the permeable element of apparatus of the present invention comprises a tape which is formed by knitting one or more suitable fibres the tape is wound under a tension which is at least just above, say 5% above, the stop stress of the tape and preferably at least double the stop stress.

By "stop stress" we mean the maximum tensile stress to which the tape can be subjected without at least straining the aforementioned one or more suitable fibres. Where a tensile stress below the stop stress is applied to a knitted tape to increase the length thereof the loops of the knitted tape distort and elongate and then relax when the tensile stress is released. Where a tensile stress above the stop stress is applied to a knitted tape to increase the length thereof the aforementioned one or more suitable fibres is (are) strained and, compared with the knitted tape at tensile stresses below the stop stress, there is a substantial increase in tensile stress to obtain a particular increase in length of the knitted tape and the tape does not relax to its original length when the tensile stress is released.

It will be appreciated that the higher the tensile stress under which a tape is wound to form a permeable element for use in apparatus of the present invention the higher is the stress which the permeable element will withstand without the layers thereof separating in operation of the apparatus. It is often convenient to subject the tape to such a tensile stress that the width thereof is reduced to the axial depth which is desired for the permeable element. It will be appreciated that there is an upper limit to the tensile stress which a tape knitted from monofilaments will withstand before it breaks. We have found that, where the tape is knitted from monofilament of diameter less than 200 microns, the tensile stress at which the tape breaks is often less than ten times the stop stress and may, for example, be about five times the stop stress.

Mean acceleration $a_m$ is defined by the equation:

$$a_m = \left(2\pi \frac{N}{60}\right)^2 \left(\frac{r_0^2 + r_1^2}{2}\right)^{\frac{1}{2}}$$

where N is the rotational speed of the permeable element about the axis of revolution in revolutions per minute, $r_0$ is the distance in meters from the aforementioned axis to the radially inner surface of the permeable element, and $r_1$ is the distance in meters from the aforementioned axis to the radially outer surface of the permeable element.

Preferably the permeable element used in apparatus of the present invention has a voidage of at least 90%. Particularly preferably the permeable element has a voidage of at least 93% and more particularly preferably the permeable element has a voltage of at least 95%.

Preferably the permeable element used in apparatus of the present invention has an interfacial area of at least 1500 meters$^2$/meters$^3$, more preferably at least 3000 meters$^2$/meters$^3$.

By "interfacial area" we mean the surface area of the permeable element which the fluids may contact per unit volume of permeable element.

By "voidage" we mean the percentage of the volume of the annulus which forms the permeable element which is free space.

By "fluid" we mean a substance or a mixture of substances, which is a gas or a liquid at the conditions of temperature and pressure at which the apparatus of the invention is operated. For example, where the second fluid is a gas it may be one gas or a mixture of gases; the first fluid and/or the second fluid (where it is a liquid) may be a neat liquid or may be a solution of one or more solutes in the liquid, which solute may be a gas, liquid or solid.

The mean acceleration as hereinbefore defined, to which the fluids are subjected in apparatus according to the present invention is preferably greater than about 5000 meters seconds$^{-2}$, since on increasing the mean acceleration to more than about 5000 meters seconds$^{-2}$, there is often a surprising increase in the rate of mass transfer.

Where the permeable element in apparatus according to the present invention is formed from a tape which comprises fibres, preferably the fibres are monofilaments, particularly preferably monofilaments having an equivalent diameter of less than about 150 microns. For example, the permeable element may be formed from a tape which is knitted from wire monofilament of 120 microns diameter.

Equivalent diameter $d_e$ is defined by the equation:

$$d_e = \frac{4 \times \text{cross-sectional area of fibre}}{\text{Perimeter of fibre}}$$

("Chemical Engineering, Volume 1, Second Edition" by Coulson and Richardson, page 210).

The cross-sectional shape of fibres, where they are employed, may be for example, circular, triangular, cruciform or triskellion, although preferably it is circular.

In annular permeable elements for use in apparatus of the present invention, the outer diameter of the annulus is typically in the range 25 cm to 5 meters, and the inner diameter is typically in the range 5 cm to 1 meter.

The tape from which the permeable element of apparatus according to the present invention is wound may be formed from any material which has the mechanical strength to withstand the stress generated in the material during rotation of the permeable element at the rotational speeds employed. Preferably the material is resistant to attack by or reaction with the fluids with which it may be in physical contact. Examples of materials from which the permeable element may be formed include inter alia glass, plastics, or metals, particularly chemically resistant metals, e.g. stainless steel, nickel, titanium or tantalum. It is often preferred that the material is metallic. Alternatively, the tape may be a composite of two or more materials in an appropriate disposition. For example, the tape may be formed by knitting together steel wire and a yarn of polytetrafluoroethylene fibres to form a tube and then collapsing the tube.

The permeable element may comprise one tape or a plurality of tapes. Where a plurality of tapes wound under tension are used to provide a permeable element they may be in the form of concentric annuli. For example, an annulus of wire mesh may be surrounded by an annulus of woven glass tape. Alternatively, a plurality of tapes, e.g. two, may be wound simultaneously such that the permeable element comprises, where two tapes are employed, alternate rings of the two tapes. Where a plurality of tapes are wound simultaneously it is often preferred that only one of them is wound under tension.

As the interfacial area for any particular permeable element is increased, the pressure drop across the permeable element increases and the possibility of fouling and flooding of the permeable element increases. Simple experiment will readily reveal a suitable permeable element for any desired speed of rotation and fluid combination.

The permeable element in apparatus of the present invention is often preferably disposed in a rotatable member.

Where a rotatable member is employed, the permeable element may be disposed throughout or in a proportion of the rotatable member. The size of the permeable element and its disposition in the rotatable member may be determined by the density and the interfacial area of the permeable element and by the flow characteristics of the fluids. Where the permeable element is disposed in a portion of the rotatable member it is often preferred that the permeable element is disposed in a radially outer portion of the rotatable member since as the distance from the axis increases, the magnitude of the centrifugal forces which operate on the fluid to form a layer increases and hence the thickness of the layer is decreased.

The rotatable member, where it is employed, may be constructed of any material which has (a) the mechanical strength to withstand the stress generated in the material during rotation of the rotatable member at the rotational speeds employed and (b) the corrosion resistance to tolerate the environments with which the rotatable member may be in contact during use. Typical materials from which the rotatable member may be constructed include inter alia stainless steel, mild steel, brass, aluminium, nickel, Monel. Choice of a suitable material will present no problem to those skilled in the art.

Conveniently the permeable element is formed by winding at least one tape under tension on a suitable former, e.g. a mandrel or spool, and preferably the aforesaid former is at least a component of the rotatable member. For example, the rotatable member may be a hollow disc having a removable lid and provided with three or more, typically six, pins symmetrically disposed adjacent the axis thereof, around which combination of pins the tape may be wound. It will be appreciated that, where the tape is wound around a combination of symmetrically disposed pins, as the number of pins employed is increased the inner face of the permeable element tends to become cylindrical.

The tape which has been wound under tension to form a permeable element for use in apparatus of the present invention is anchored such that it is maintained under a tension which is at least a substantial portion of the tension under which it was wound and which is preferably substantially the tension under which it was wound. Conveniently the outer end of the tape is attached to the body of the permeable element by suitable means. For example, one or more pins may be forced through the outer end of the tape and thence through the layers of tape and attached to the mandrel on which the tape was wound.

As the first fluid flows radially outwards through the rotating permeable element the pressure to which the first fluid is subjected increases. Thus, where counter-current flow is employed, it will be appreciated that to charge the permeable element with the second fluid, the second fluid may have to be at pressure greater than that of the first fluid at the position on the permeable element at which the permeable is charged with the second fluid.

Where the permeable element is supported in a rotatable member, means to deliver the first fluid to the permeable element typically comprises an orifice in the rotatable member through which the fluid may flow. Where the rotatable member is a hollow disc the delivery means is conveniently axially disposed, although we do not exclude the possibility that it may be located intermediate the axis of rotation and the means to charge the second fluid to the permeable element. Where the first fluid is a mixture of components, these may be delivered to the permeable element through the same or separate delivery means, e.g. they may be delivered through concentric tubes.

Where a permeable element supported in a rotatable member is employed in apparatus according to the present invention, means to discharge the first fluid or a component or derivative thereof from the rotatable member typically comprises a multiplicity of orifices in the periphery of the rotatable member distant the axis of rotation, through which orifices the fluid may issue as a spray.

Where a permeable element supported in a rotatable member is employed in apparatus according to the present invention means to discharge the second fluid or a component or derivative thereof from the rotatable member typically comprises one or more orifices in the rotatable member through which the second fluid or a component or derivative thereof may flow. Where the rotatable member is a hollow disc in which an annular permeable element is disposed the orifice is conveniently axially disposed.

Conveniently, the permeable element, or the rotatable member, where it is employed, is mounted in a stationary fluid-collecting means, e.g. a housing or casing, in which fluid-collecting means the fluid or component or derivative thereof which is discharged from the permeable element distant the axis of rotation may be collected. Moreover, where the stationary fluid-collecting means is in the form of a sealed housing the second fluid may be charged thereto and thence to the permeable element, e.g. via suitably disposed orifices in the rotatable member.

It will be appreciated that for the generation in the permeable element of a liquid surface of large area, the first fluid and/or the second fluid, where it is a liquid, preferably "wets" substantially the whole of the wall surface of the pores of the permeable element. Wetting of the permeable element will depend to a degree on dynamic factors but will be assisted if it is favoured by equilibrium wetting conditions. Thus, a fluid having a small interfacial tension with the permeable element will tend to displace from the surface of the pores of the permeable element a fluid having a large interfacial tension with the permeable element, which displacement process is assisted by a small interfacial tension between the two fluids. To improve the "wetting" of the permeable element the surface of the pores of the permeable element is preferably coated with a wetting agent, or a wetting agent is preferably added to at least one of the fluids. For example where the first fluid is water and the pores of the permeable element have a hydrophobic surface, e.g. the permeable element comprises a mat of polytetrafluoroethylene fibres, suitable surfactants, e.g. sodium dodecylsulphate or a Monflur (RTM) surfactant, may be added to the water. Where the first and second fluids are liquids it is often preferred that the wall surfaces of the pores are "wetted" preferentially by the first fluid.

A plurality of permeable elements, each provided with suitable fluid-collecting means, typically a housing, although we do not exclude the possibility that a cirumferential channel and associated removal means as hereinbefore described may be employed, may be joined in series fluid flow communication. It will be appreciated that suitable pumps where appropriate may be provided in the lines interconnecting adjacent permeable elements. Optionally the permeable elements are mounted along a common axis. While the fluids may flow co-currently through the series, it is often preferred that counter-current flow operates.

The apparatus according to the present invention may be employed in inter alia absorption, desorption, counter current extraction, distillation and homogenisation processes.

Apparatus of the present invention in which the permeable element comprises a knitted tape wound under tension gives better mass transfer and flooding characteristics than apparatus in which the permeable element comprises a similar knitted tape which has been loosely wound.

By better mass transfer characteristics we mean that the height of a transfer unit has been reduced and by better flooding characteristics we mean that flood points at least approach or in may instances are above the Sherwood-Lobo curve as defined in "Chemical Engineering Volume 2", First Edition by Coulson and Richardson at page 411.

The invention will be further described by reference to the accompanying drawings, which show, by way of example only, apparatus for effecting mass transfer between two fluid phases according to the present invention.

Figure 1:
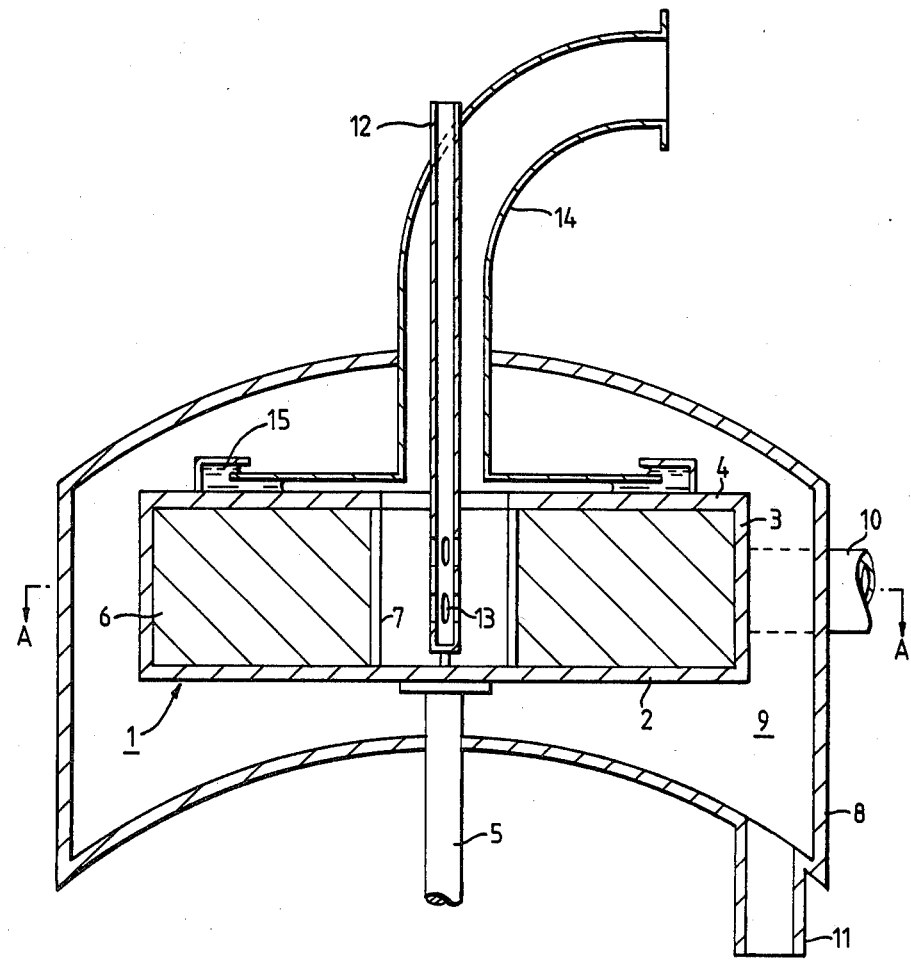
FIG. 1 is a longitudinal cross-section of a gas-absorber.
Figure 2:
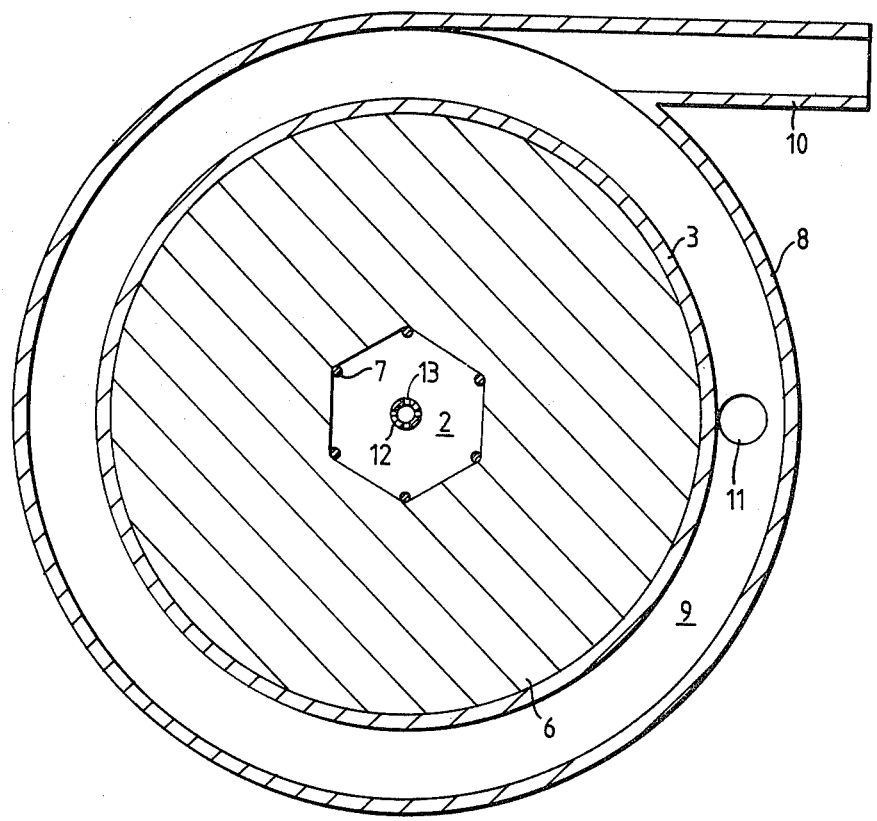
FIG. 2 is a transverse cross-section on the line AA of FIG. 1.

Referring firstly to FIGS. 1 and 2, a rotatable element 1 in the form of a hollow disc comprising a base 2, cylindrical outer wall 3, which is provided with a multiplicity of orifices (not shown), and an annular top 4 is mounted upon a shaft 5 by means of which it is rotated in an anti-clockwise direction. Mounted symmetrically about the axis of rotation of the rotatable element 1 is an annular permeable element which has been formed by winding a tape under a desired tension around the six pins 7; the direction of winding of the tape is such that when the permeable element is mounted in the rotatable element the tape appears as a clockwise spiral running from the centre to the outside of the permeable element. The tape employed in the embodiment is knitted from a metallic monofilament and sold under the Registered Trade Mark "Knitmesh".

The rotatable element is axially disposed within a generally cylindrical container 8, defining a chamber 9 and provided with conduits 10 and 11 for the introduction of gas and discharge of liquid respectively from the chamber 9. Liquid is introduced to the apparatus via liquid feed pipe 12, disposed axially with respect to the container 8, provided with a series of discharge slots 13 in its lower end, and concentric for a part of its length with a gas discharge pipe 14. A liquid seal 15 is provided on the top 4.

In operation of the apparatus, liquid supplied by feedpipe 12 is sprayed via slots 13 on to the inner face of the permeable element 6 through which it is forced radially outwards by centrifugal force. Gas enters the apparatus via the conduit 10; the liquid seal 15 prevents the gas by-passing the permeable element 6 and it is forced through the pores of the permeable element 6 where it contacts the liquid. The liquid is discharged from the rotatable element via the orifices in outer wall 3, into chamber 9, from which it is drained via liquid discharge conduit 11. The gas is discharged from the permeable element 6 at its inner face and leaves the apparatus via gas discharge pipe 14.

Various aspects of the present invention will now be described with reference to the following Examples which are illustrative of the invention.

EXAMPLES 1-3

General Procedure for the Preparation of a Permeable Element from a Knitted Tape A tape was subjected to an increasing load until permanent elongation occurred and its stop stress was calculated.

A further sample of the tape was wound, under an applied load which was greater than the load required to give the stop stress, on a mandrel formed by six pins attached in a suitable configuration to a steel base to form a permeable element of axial depth 2.3 cm, inner diameter 9.6 cm and outer diameter 21.6 cm. The outer end of the tape was anchored by attaching it to the body of the permeable element.

Details of the tapes used and the conditions under which the tapes were wound are given in Table 1.

The permeable elements were separately mounted in a hollow disc as illustrated in FIGS. 1 and 2, but having a transparent lid and were rotated at a mean acceleration of 10,000 meters seconds$^{-2}$ whilst water, at a rate of 5 liters per minute, flowed through for 25 hours. The rotating permeable elements were viewed under a stroboscope and no separation of the layers of tape was observed.

Figure 3:
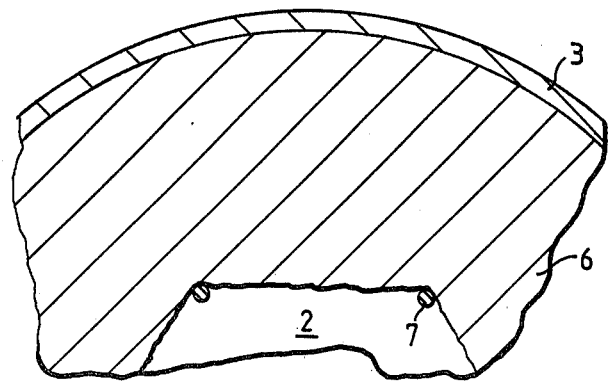
FIGS. 3, 4 and 5 are diagrammatic representations of portions of known permeable elements in operation.
Figure 4:
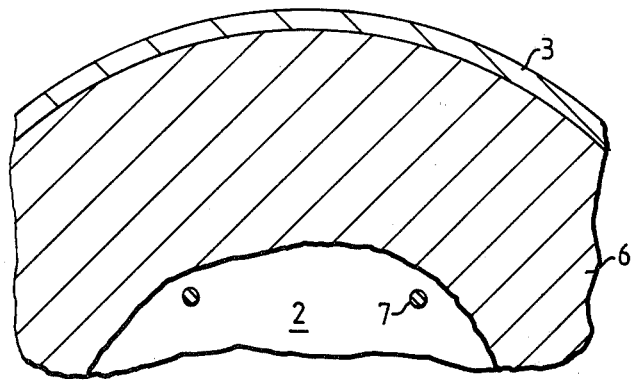
Figure 5:
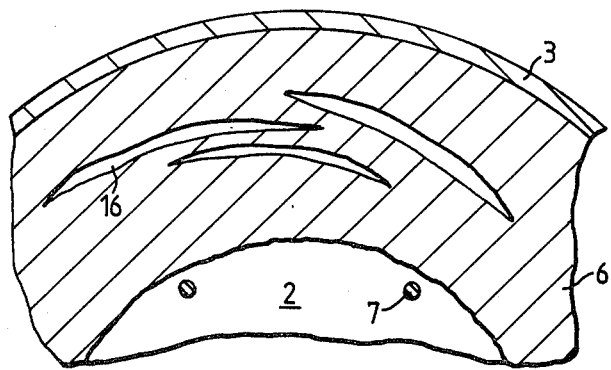

In a comparative experiment a permeable element formed from loosely wound tape was used. At the start and finish of the experiment the inner layer of tape was in contact with the pins 7 of the rotatable element as shown in FIG. 3. As the speed of rotation was increased the tape detached itself from the pins 7 and moved radially outwards, as shown in FIG. 4, at about 900 meters seconds$^{-2}$ and at about 8000 meters seconds$^{-2}$ distinct crescent-shaped gaps 16 could be seen in the permeable element 6 as shown in FIG. 5.

TABLE 1

| | Tape | | | | | Load to Stop Stress (kgs) | Stop$^a$ Stress (N/m$^2$) | Permeable Element | | | | |
|---|---|---|---|---|---|---|---|---|---|---|---|---|
| | | | | | | | | | Tensile Stress | | | Interfacial |
| Example | Source | Material | Filament Diameter (microns) | Original Width (cm) | Original Thickness (mm) | | | Applied Load (kgs) | (N/m$^2$) | As % of Stop Stress | Voidage (%) | Area (m$^2$/m$^3$) |
| 1 | Knitmesh 9037 | Copper | 120 | 4.7 | .457 | 0.5 | 2.3 × 10$^5$ | 1.9 | 8.7 × 10$^5$ | 380 | 93 | 2200 |
| 2 | Knitmesh 9017 | Stainless Steel | 150 | 5.4 | .483 | 1.5 | 5.6 × 10$^5$ | 4.8 | 18.0 × 10$^5$ | 320 | 91 | 2300 |
| 3 | Knitmesh 9078 | Stainless Steel | 150 | 6.7 | .483 | 2.3 | 7.0 × 10$^5$ | 4.8 | 14.5 × 10$^5$ | 210 | 90 | 2700 |

$^a$Stop Stress = $\dfrac{\text{Load to Stop Stress}}{\text{Original Width} \times \text{Original Thickness}}$ Thus it can be seen that a permeable element formed from a tape wound under tension is mechanically more stable than a permeable element formed from a loosely wound tape.

EXAMPLE 4

The annular permeable element prepared in Example 3 was mounted in a hollow disc as illustrated in FIGS. 1 and 2. The permeable element was rotated and water was charged to it to flow radially outwards through the pores thereof while "white-spot" nitrogen at 0.5 meters$^2$ per minute was charged to the permeable element to flow radially inwards.

The concentration of oxygen in the water charged to the permeable element and discharged therefrom was measured using a dissolved oxygen probe and the height of a transfer unit (HTU) was calculated using the equation:

$$HTU = \frac{r_1 - r_o}{\ln \frac{\text{(concentration of O}_2\text{ in charging water)}}{\text{(concentration of O}_2\text{ in discharging water)}}}$$

where $r_o$ and $r_1$ have the meanings hereinbefore ascribed to them. The results are shown in Table 2.

In comparative experiments, a permeable element formed from a block of Retimet 45 (ex Dunlop) (interfacial area 2600 meters$^2$/meters$^3$, voidage 95%) was used.

From the results shown in Table 2 it can be seen that the use of a permeable element formed by winding a tape under tension gives better mass transfer, as indicated by lower values for H.T.U., than a permeable element formed from Retimet 45, which is more expensive.

TABLE 2

| Example | Water Flow (liters/min) | Speed of Rotation (r.p.m.) | Mean Acceleration (meters seconds$^{-2}$) | H.T.U. (cms) |
|---|---|---|---|---|
| CT | 10 | 2000 | 3566 | 1.5 |
| 4 | 10 | 2350 | 5061 | 1.2 |
| 4 | 10 | 2565 | 6030 | 1.0 |
| 4 | 10 | 2980 | 8140 | 1.0 |
| CT | 10 | 3000 | 8249 | 1.3 |
| 4 | 10 | 3410 | 10658 | 1.0 |
| CT | 15 | 2000 | 3566 | 1.5 |
| 4 | 15 | 2350 | 5061 | 1.2 |
| 4 | 15 | 2565 | 6030 | 1.1 |
| 4 | 15 | 2980 | 8140 | 1.0 |
| CT | 15 | 3000 | 8249 | 1.4 |
| 4 | 15 | 3410 | 10658 | 1.0 |
| CT | 20 | 2000 | 3566 | 1.3 |
| 4 | 20 | 2350 | 5061 | 1.1 |
| 4 | 20 | 2565 | 6030 | 1.0 |
| 4 | 20 | 2980 | 8140 | 0.9 |
| 4 | 20 | 3410 | 10658 | 1.0 |

CT = Comparative Test

We claim:

1. In apparatus for effecting mass transfer between two fluid phases, at least the first of which is a liquid, which apparatus comprises an annular permeable element which is rotatable about its axis of symmetry, means to charge the first fluid to the permeable element, means to charge the second fluid to the permeable element and means to discharge at least one of the fluids or a derivative thereof from the permeable element, the improvement wherein at least a part of the radial depth of the permeable element relative to said axis of symmetry is formed by radially overlapping layers of a tape, which tape is of a knitted or woven fabric and has been wound around said axis under a tension which exceeds the stop stress of said tape and secured to maintain said tape under tension.

2. The apparatus of claim 1, wherein the tension under which the tape is wound is at least 5 percent above the stop stress of said tape.

3. The apparatus of claim 2, wherein said tension is at least double said stop stress.

4. The apparatus of claim 1, wherein said tape is formed from monofilaments.

5. The apparatus of claim 4, wherein said monofilaments have an equivalent diameter less than about 150 microns.

6. Apparatus for effecting mass transfer between two fluid phases, at least the first of which is a liquid, which apparatus comprises: an annular permeable element mounted for rotation about its axis of symmetry, said annular permeable element being formed at least in part from layers of a tape which overlap radially with respect to said axis of symmetry, said tape being of a knitted or woven fabric and having been formed into said permeable element by winding said tape around said axis under a tension which is at least 5 percent greater than the stop stress of said tape and said tape further being secured so as to maintain it under tension; means to charge said first fluid to said permeable element; means to charge said second fluid to said permeable element; and means to discharge at least one of said fluids or a derivative thereof from said permeable element.

* * * * *